US012111106B2

(12) United States Patent
Nishibayashi et al.

(10) Patent No.: US 12,111,106 B2
(45) Date of Patent: Oct. 8, 2024

(54) VACUUM DRYER

(71) Applicant: SUGINO MACHINE LIMITED, Uozu (JP)

(72) Inventors: Motoki Nishibayashi, Uozu (JP); Toyoaki Mitsue, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 529 days.

(21) Appl. No.: 17/582,761

(22) Filed: Jan. 24, 2022

(65) Prior Publication Data

US 2022/0299264 A1 Sep. 22, 2022

(30) Foreign Application Priority Data

Mar. 22, 2021 (JP) ................................ 2021-047515

(51) Int. Cl.
*F26B 5/04* (2006.01)
*F26B 11/14* (2006.01)

(52) U.S. Cl.
CPC ................ *F26B 5/04* (2013.01); *F26B 11/14* (2013.01)

(58) Field of Classification Search
CPC .................................. F26B 5/04; F26B 11/14
See application file for complete search history.

(56) References Cited

U.S. PATENT DOCUMENTS 5,337,497 A 8/1994 Sato et al.
6,524,539 B1 * 2/2003 Katschnig ................ F26B 7/00 422/295
9,709,327 B2 * 7/2017 Marchiori ............... F26B 25/16
2003/0014879 A1 * 1/2003 Horigane ............. F26B 11/181 34/92
2005/0217136 A1 * 10/2005 Blankenship ........... F26B 5/048 34/406
2021/0116178 A1 * 4/2021 Zielinski ................. F26B 23/04

FOREIGN PATENT DOCUMENTS

CN 203572153 U 4/2014
CN 110631341 A 12/2019
CN 210546601 U 5/2020

(Continued)

OTHER PUBLICATIONS

Extended European Search Report mailed on Jun. 7, 2022 in a corresponding European Patent Application No. 22152945.6 (8 pages).

(Continued)

*Primary Examiner* — David J Laux
(74) *Attorney, Agent, or Firm* — United IP Counselors, LLC

(57) ABSTRACT

The vacuum dryer includes: a first half chamber having a first opening, and a drying table on which a workpiece is fixed and positioned at a drying phase; a second half chamber having a second opening and coupled with the first half chamber to form a hermetic chamber; a first moving device that moves the second half chamber relative to the first half chamber between a separated position and a coupled position; a first volume adjusting body disposed in the second half chamber and having a shape that does not collide with the workpiece and the drying table when the drying table is positioned at the drying phase and the second half chamber is located at the coupled position; and a vacuum pump.

19 Claims, 8 Drawing Sheets

(56) References Cited

FOREIGN PATENT DOCUMENTS

| | | | |
|---|---|---|---|
| JP | 2010-032116 | A | 2/2010 |
| JP | 2015-064130 | A | 4/2015 |
| JP | 6128688 | B2 | 5/2017 |

OTHER PUBLICATIONS

Office Action mailed on Jul. 13, 2021 in a corresponding Japanese patent application No. 2021047515 (4 pages).
Chinese Office Action mailed on Mar. 1, 2024 in a corresponding Chinese Patent Application No. 202210158091.6 (8 pages).

* cited by examiner

VACUUM DRYER

CROSS-REFERENCE TO RELATED APPLICATIONS

This application claims the benefit of priority to Japanese Patent Application No. 2021-047515, filed on Mar. 22, 2021, the entire contents of which are hereby incorporated by reference.

BACKGROUND

1. Technical Field

The present invention relates to a vacuum dryer.

2. Description of the Background

A known vacuum dryer (Japanese Patent No. 6128688) includes a mounting table on which a workpiece to be dried is mounted, a rotating device for rotating the mounting table and positioning the mounting table at a predetermined angle, moving means for moving the mounting table relative to a drying chamber to position the workpiece at a retracted position outside the drying chamber and a vacuum position inside the drying chamber, and sealing means for sealing an opening of the drying chamber in which the workpiece is positioned at the vacuum position.

BRIEF SUMMARY

An object of the present invention is to provide a vacuum dryer capable of reducing a drying time.

A first aspect of the present invention provides a vacuum dryer for drying a workpiece, the vacuum dryer including:

- a first half chamber having
  - a first opening, and
  - a rotatable drying table on which the workpiece is fixed, the drying table configured to be positioned at a drying phase;
- a second half chamber having a second opening configured to be in close contact with the first opening, the second half chamber configured to be coupled with the first half chamber to form a hermetic chamber;
- a first moving device configured to move the second half chamber relative to the first half chamber between a separated position and a coupled position, the second half chamber being separated from the first half chamber at the separated position, and the second opening being in close contact with the first opening at the coupled position;
- a first volume adjusting body disposed in the second half chamber, the first volume adjusting body having a shape that does not collide with the workpiece and the drying table when the drying table is positioned at the drying phase and the second half chamber is located at the coupled position; and
- a vacuum pump connected to the hermetic chamber.

When the second half chamber is at the separated position, the drying table on which the workpiece is installed is rotatable about the rotation axis. Thus, before vacuum drying, the workpiece is to be spin-dried. As only the workpiece and the drying table are rotatable and the first half chamber is not rotated, the inertia of the rotating object is reduced. Then, it is easy to increase the rotation speed. As the centrifugal force acting on the liquid adhered to the workpiece is proportional to the square of the rotation speed, the liquid is easily detached from the workpiece when the rotation speed increases. Further, the rotating device can be miniaturized.

Preferably, half or more of the volume of the rotating body in which the workpiece is rotated about the rotation axis protrudes to the outside of the first opening.

With the drying table positioned at the drying phase and the first half chamber and the second half chamber being coupled, the shape of the space in which the workpiece and the drying table are not arranged is determined in the hermetic chamber. Thus, the first volume adjusting body having substantially the same shape as the space other than the workpiece and the drying table in the hermetic chamber can be disposed in the second half chamber. The drying table is positioned at the drying phase, and the second chamber containing the first volume adjusting body is moved to the coupled position. Thus, a space other than the workpiece and the drying table in the hermetic chamber is occupied by the first volume adjusting body. This reduces the volume of the space in the hermetic chamber. When the vacuum pump evacuates the gas in the hermetic chamber after the workpiece is accommodated in the hermetic chamber, the time required for decompression is obtained by dividing the volume of the gas by the degassing rate. As the volume of the space in the hermetic chamber, i.e., the volume of the gas, is reduced by the first volume adjusting body, the time required for decompression is shortened.

The drying table may be rotated about a horizontal axis.

The first volume adjusting body may be removably disposed in the second half chamber. The second volume adjusting body may be removably disposed in the first half chamber. The first volume adjusting body and the second volume adjusting body may be appropriately replaced according to the plurality of workpiece. The first volume adjusting body or the second volume adjusting body may be a solid material.

The first cleaning fluid or the second cleaning fluid may be a heating fluid or a gas. More specifically, the first cleaning fluid and the second cleaning fluid are, for example, compressed air, dry air, heated air, cleaning liquid, or steam. The first cleaning fluid and the second cleaning fluid may be supplied from the outside of the dryer. When the second half chamber is at the separated position, the first cleaning fluid or the second cleaning fluid may be ejected onto the workpiece. As the cleaning fluid can be ejected while the workpiece is rotated by the drying table, the cleaning fluid can be ejected over the periphery of the workpiece.

The vacuum dryer may include a rotating device for rotating the drying table. The rotating device is, for example, a motor, a cylinder, or a cam. Preferably, the rotating device is a synchronous motor. Preferably, the rotation device includes a rotation speed meter. The rotating device couples with a swivel shaft.

The vacuum dryer may further include a first sealing member for sealing the gap between the first opening and the second half chamber.

The first cleaning fluid or the second cleaning fluid may be a warmed fluid such as heated air or steam. Thus, the workpiece and the first half chamber are warmed to promote the vacuum drying.

The vacuum dryer may include a first ejection block and a first ejection pipe for supplying a first clean fluid to the first nozzle. The first ejection block and the first ejection pipe extend along the rotation axis of the drying table. One or more first nozzles may be disposed along the rotation axis. The first nozzle may be disposed on the first ejection block or the first ejection pipe. The first nozzle is disposed within the first half chamber. Preferably, the first nozzle ejects the first clean fluid in a direction toward the first opening 11*a*.

The vacuum dryer may include a first fluid source. The vacuum dryer may have a shut-off valve. The shut-off valve is located in the middle between the first nozzle and the first fluid source. The shut-off valve may be included in the first fluid source. When the hermetic chamber is depressurized, the shut-off valve prevents the first fluid from flowing into the hermetic chamber via the first nozzle and the first fluid source.

The vacuum dryer may include a second ejection block or a second ejection pipe. The second ejection block and the second ejection pipe supplies the second cleaning fluid to the second nozzle. The second ejection block and the second ejection pipe extend along the rotation axis of the drying table. One or more second nozzles may be disposed along the rotation axis. The second nozzle may be disposed on the second ejection block or the second ejection pipe.

The second volume adjusting body may have a through hole. The third volume adjusting body may be slidably disposed through the through hole of the second volume adjusting body. The first half chamber may have a third opening. The third volume adjusting body may pass through the third opening. The third volume adjusting body and the third opening are sealed. For example, a second seal (reciprocating seal) may be disposed between the third volume adjusting body and the third opening.

The vacuum dryer may include a vacuum breaking valve. The vacuum breaking valve is disposed in the first half chamber or the second half chamber. The vacuum breaking valve may be included in a vacuum pump. The vacuum breaking valve is a two-way valve having a first port and a second port. The first port is connected to the interior of the hermetic chamber, while the second port is open to the outside air. The vacuum breaking valve is normally closed. Atmosphere is introduced from the outside into a depressurized hermetic chamber when the vacuum breaking valve is opened.

The vacuum dryer may include a turntable. The turntable is, for example, a two-position turntable to be positioned at every 180 degree. The turntable may be a three-position turntable to be positioned at every 120 degree. At each position of the turntable, the first half chamber with the drying table is arranged. One of the specific positions is a loading position. One of the specific positions is the pre-cleaning position. The second nozzle is disposed at the pre-cleaning position. Another specific positions is a vacuum drying position. The second half chamber is disposed at the vacuum drying position. That is, the same number of first half chamber and the drying table as the specific position of the turntable are disposed on the turntable. A single second half chamber is arranged at the vacuum drying position. The second nozzle is arranged at the pre-cleaning position. In the case of the two-position turntable, the second nozzle is located at the loading position, while the loading position also serves as the pre-cleaning position.

In the vacuum dryer with the two-position turntable, the turntable is firstly turned to move the first workpiece after drying to the loading position, and the second workpiece after pre-drying moves to the vacuum drying position. The pre-drying includes spin drying, blowing, or hot blowing.

At the loading position, the following procedure is performed in order. A second workpiece is unclamped and removed. A third workpiece is installed and clamped. The third workpiece is pre-dried and located to the drying phase.

At the vacuum drying position, the following procedure is performed in order. The second half chamber is coupled to the first half chamber to form a hermetic chamber. The inside of the hermetic chamber is depressurized to dry the first workpiece. The inside of the hermetic chamber is restored to atmospheric pressure. The second half chamber is separated from the first half chamber.

The vacuum dryer according to the present invention reduces a drying time.

DETAILED DESCRIPTION

First Embodiment

Figure 1:
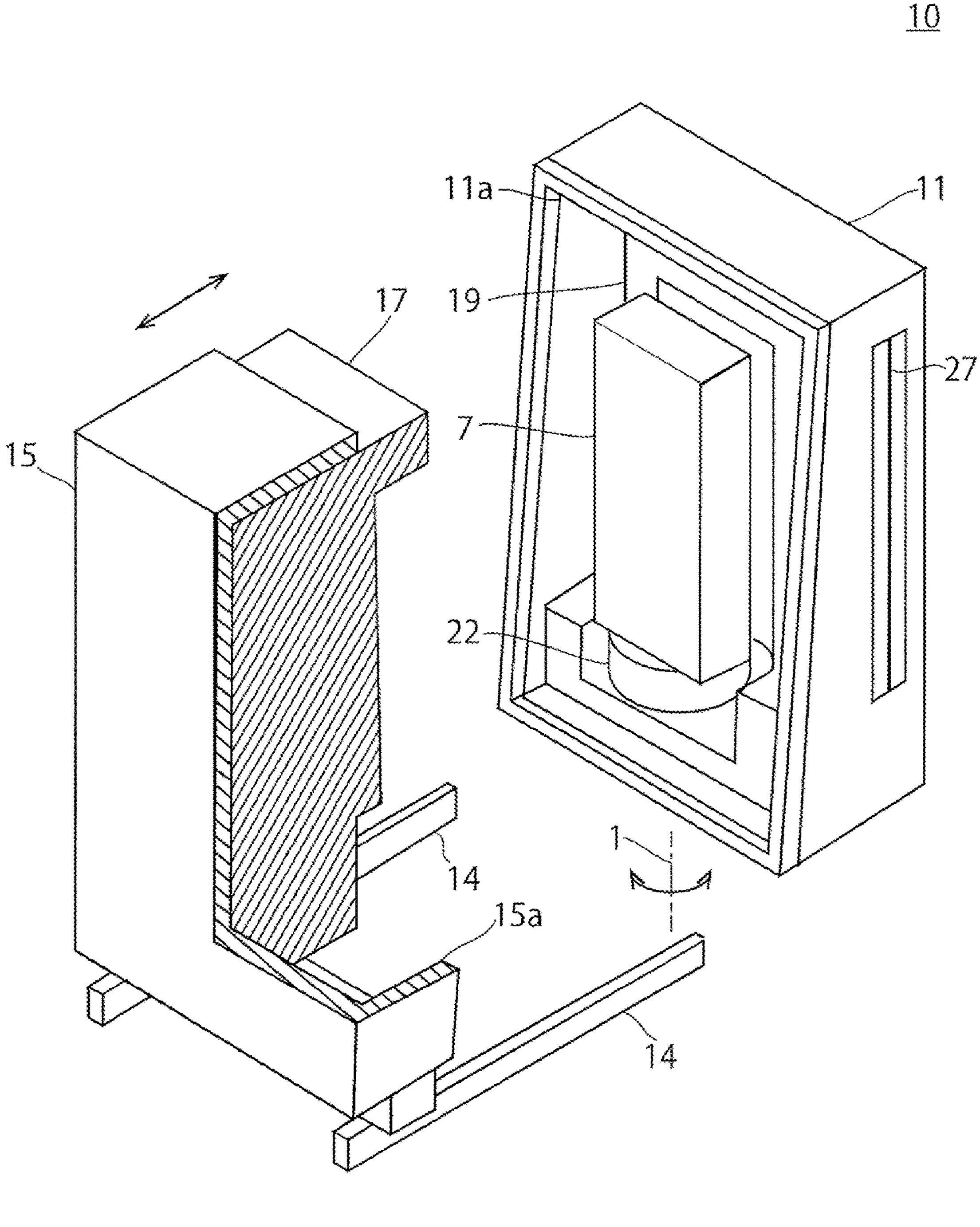
FIG. 1 is a perspective view of a vacuum dryer according to a first embodiment with some part being cut.
Figure 2:
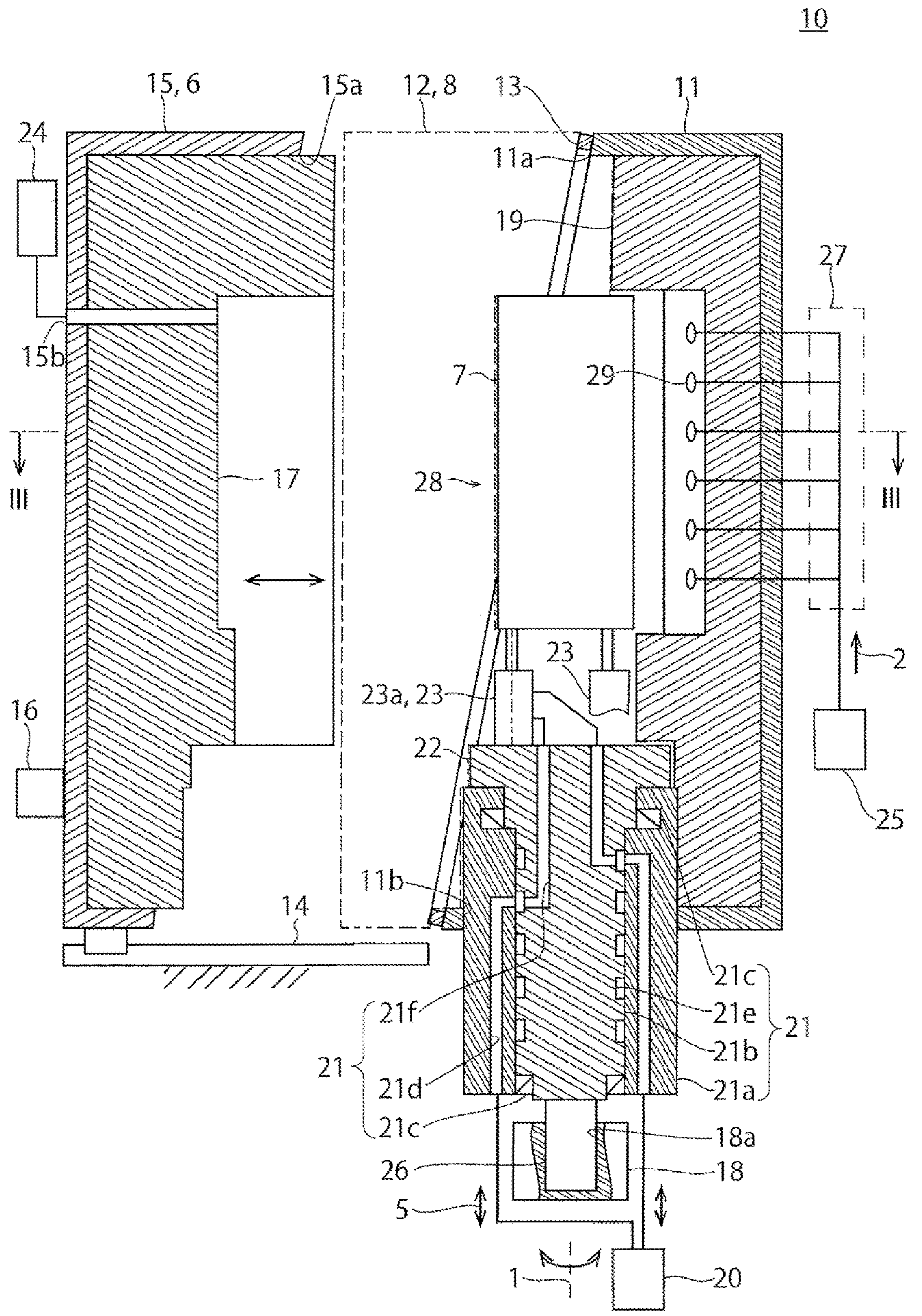
FIG. 2 is a longitudinal sectional view of the vacuum dryer according to the first embodiment.
Figure 3:
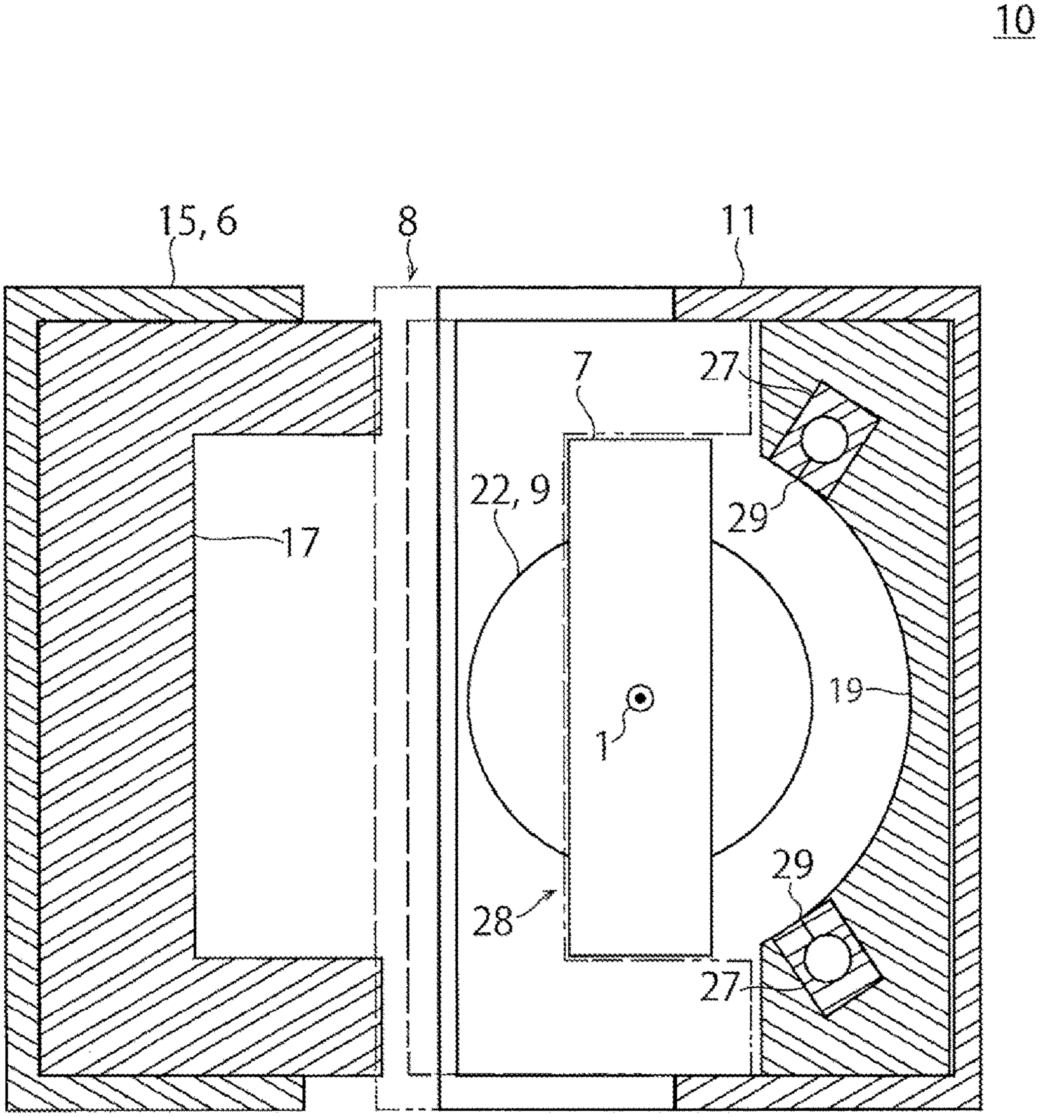
FIG. 3 is a cross-sectional view along line III-III in FIG. 2.

As shown in FIGS. 1 to 3, a vacuum dryer 10 according to the present embodiment includes a first half chamber 11, a second half chamber 15, a first volume adjusting body 17, a moving device (first moving device) 16, a vacuum pump 24, a packing (first sealing member) 13, a linear motion guide 14, a rotating device 18, a second volume adjusting body 19, a swivel joint 21, a drying table 22, a clamp 23, a working fluid source 20, an input shaft 26, a first fluid source 25, a first nozzle block 27, and a first nozzle 29.

A workpiece 7 to be dried is mounted on the drying table 22. The drying table 22 rotates about a rotation axis 1 together with the workpiece 7. For example, the workpiece 7 is rectangular parallelepiped. FIG. 2 is a cross-sectional view showing the vacuum dryer in a plane including a reciprocating direction of the linear motion guide 14 and the rotation axis 1. For convenience, the left direction in FIG. 2 is referred to as forward direction, the right direction in FIG. 2 is referred to as backward direction, the upper direction in FIG. 2 is referred to as upward direction, and the lower direction in FIG. 2 is referred to as downward direction.

The first half chamber 11 has a first opening 11*a*, and a table mounting hole 11*b*. The first half chamber 11, which has the first opening 11*a* at the front, is a box-shaped chamber with the lateral sides, upper side, lower side and rear side closed. The first opening 11*a* is inclined backward as it is directed upward. The packing 13 is disposed at the front end surface of the first opening 11*a*. For example, the packing 13 is an O-ring. A groove is formed in the first opening 11*a* around the entire front end surface. The packing 13 is arranged in the groove.

The table mounting hole 11*b* is disposed, for example, on a bottom surface of the first half chamber 11. In other words, the lower end of the first opening 11*a* is disposed in front of the swivel joint 21.

Installed on the drying table 22, a portion of the workpiece 7 protrudes outside of the first opening 11*a*. Preferably, half or more of the volume of the rotating body in which the workpiece 7 is rotated about the rotation axis 1 protrudes outside of the first opening 11*a*.

Figure 7:
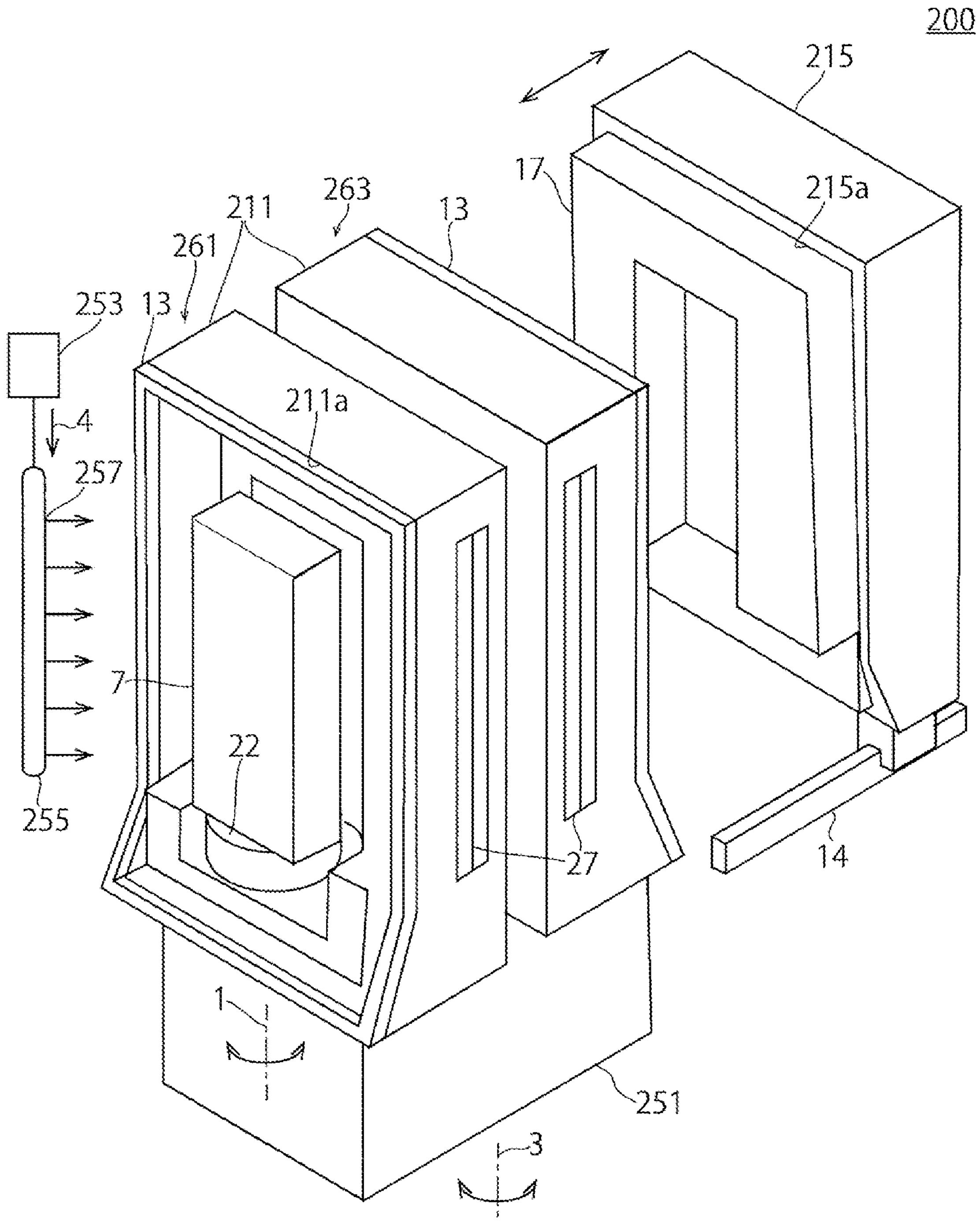
FIG. 7 is a perspective view of the vacuum dryer according to a third embodiment.

As shown in FIG. 7, the upper portion of the first opening 11*a* may extend in the vertical direction.

The swivel joint 21 is disposed through the table mounting hole 11*b*. The swivel joint 21 includes a housing 21*a*, a swivel shaft 21*b*, a bearing 21*c*, an annular channel 21*e*, a first channel 21*d*, and a second channel 21*f*.

The housing 21*a*, which is a hollow cylindrical shape, is fixed to the table mounting hole 11*b*. The swivel shaft 21*b* is a cylindrical shape. The swivel shaft 21*b* is rotatably supported inside the housing 21*a* with the bearing 21*c*.

The annular channel 21*e* is disposed between the swivel shaft 21*b* and the housing 21*a* in a circumferential direction. A plurality of annular channels 21*e* are arranged in the vertical direction. The same number of first channels 21*d* and the second channels 21*f* as the annular channels 21*e* are arranged, respectively. For convenience, FIG. 2 shows two first channels 21*d* and two second channels 21*f*. The first channel 21*d* is disposed inside the housing 21*a*. Each first channel 21*d* has one end opened to the lower end of the housing 21*a*, and the other end connected to one of the annular channels 21*e*. The second channel 21*f* is disposed inside the swivel shaft 21*b*. Each second channel 21*f* has one end opened to the upper end of the swivel shaft 21*b*, and the other end connected to one of the annular channels 21*e*.

The drying table 22 is disposed at the upper end of the swivel shaft 21*b*. The drying table 22 rotates together with the swivel shaft 21*b*.

The clamp 23, which includes a fluid cylinder 23*a*, is arranged on the drying table 22. The clamp 23 clamps the workpiece 7 to the drying table 22. The workpiece 7 is disposed at a predetermined position of the drying table 22 with a positioning pin or a seating pin. The fluid cylinder 23*a* is, for example, a double acting cylinder. Two fluid ports of the fluid cylinder 23*a* are respectively connected to the second channel 21*f*.

The working fluid source 20 supplies working fluid 5 to the clamp 23. The working fluid 5 is, for example, compressed air. The working fluid source 20 is, for example, a compressed air supply port, or an air compressor. Preferably, the working fluid source 20 includes a channel switching valve. The working fluid source 20 is connected to the first channel 21*d*.

The input shaft 26 is disposed at the lower end of the swivel shaft 21*b* to protrude from the swivel joint 21. The input shaft 26 rotates integrally with the swivel shaft 21*b*.

The rotating device 18 is a servo motor. The rotating device 18 may include a reducer. The rotating device 18 includes an output shaft 18*a*. The output shaft 18*a* is connected to the input shaft 26. The output shaft 18*a* may be a hollow shaft. The input shaft 26 may be inserted into the output shaft 18*a*. The rotating device 18 rotates the drying table 22 to position it at a predetermined drying phase 9.

The second half chamber 15 has a second opening 15*a*, and a vacuum port 15*b*. The second half chamber 15 is arranged on the linear motion guide 14. The second half chamber 15 reciprocates back and forth between a separated position 6 and a coupled position 8 with the moving device 16. At the separated position 6, the second opening 15*a* and the first opening 11*a* are separated from each other. At the coupled position 8, the second opening 15*a* and the first opening 11*a* are in close contact to form a hermetic chamber 12 with the first half chamber 11 and the second half chamber 15. The second half chamber 15 has the second opening 15*a* at the rear, and the front, the lateral sides, the upper side, and lower side are closed. The second opening 15*a* is inclined backward as it is directed upward. The second opening 15*a* has a corresponding shape to the first opening 11*a*.

The vacuum pump 24 includes a relief valve. The vacuum pump 24 is connected to the vacuum port 15*b*. The vacuum pump 24 vacuums the inside of the hermetic chamber 12, or introduces outside air into the hermetic chamber 12 to return the pressure inside the hermetic chamber 12 to atmospheric pressure.

The linear motion guide 14 is, for example, a linear guide, or a ball spline. Preferably, the vacuum dryer 10 includes a set of linear motion guides 14. The moving device 16 is, for example, a cylinder or a servomechanism. The cylinder is, for example, an electric cylinder or a fluid cylinder. The moving device 16 presses the second opening 15*a* toward the first opening 11*a* at the coupled position 8. The second opening 15*a* thus squeezes the packing 13 to form the hermetic chamber 12 with the first half chamber 11 and the second half chamber 15.

The first volume adjusting body 17 is disposed inside the second half chamber 15 and is fixed to the second half chamber 15. As shown in FIGS. 2 and 3, the first volume adjusting body 17 has substantially the same shape as a space in the inner front portion of the hermetic chamber 12 with the drying table 22 at the drying phase 9. The first volume adjusting body 17 has a shape that does not interfere with the workpiece 7, the clamp 23, the drying table 22, and the swivel joint 21 when the second half chamber 15 moves from the separated position 6 to the coupled position 8. The shape of the workpiece 7, the drying table 22, the swivel joint 21, and the clamp 23 when the workpiece 7 is installed on the drying table 22 positioned at the drying phase 9 is defined as an inner shape 28. The first volume adjusting body 17 and the inner shape 28 are shapes capable of combining the irregularities of each other. The first volume adjusting body 17 is removably installed in the second half chamber 15.

The first volume adjusting body 17 may be a solid material. The material of the first volume adjusting body 17 is, for example, plastic or metal. The first volume adjusting body 17 may be divided into a plurality of members. At this time, some of the members may be interchangeable with other members having different shapes. In this case, combining the members of the first volume adjusting body 17 according to the shape of the workpiece 7 allows to adapt to the various workpieces 7.

As shown in FIG. 2, the first volume adjusting body 17 may have a through hole connected to the vacuum port 15*b*.

The second volume adjusting body 19 is disposed inside the first half chamber 11 and is fastened to the first half chamber 11. As shown in FIGS. 2 and 3, the second volume adjusting body 19 has a shape in which the drying table 22, the clamp 23, and the workpiece 7 do not collide with the second volume adjusting body 19 when the drying table 22 rotates. In addition, the second volume adjusting body 19 has a shape that does not collide with the first volume adjusting body 17 when the second half chamber 15 moves from the separated position 6 to the coupled position 8. The second volume adjusting body 19 substantially has a shape obtained by subtracting the shape of the rotating body of the workpiece 7, the clamp 23, and the drying table 22, the swivel joint 21, and the first volume adjusting body 17 from the shape of the internal space of the hermetic chamber 12.

The second volume adjusting body 19 may be a solid material. The material of the second volume adjusting body 19 is, for example, plastic or metal. The second volume adjusting body 19 may be divided into a plurality of members. At this time, some of the members may be interchangeable with other members having different shapes. In this case, combining the members of the second volume adjusting body 19 according to the shape of the workpiece 7 allows to adapt to the various workpieces 7.

The total volume of the first volume adjusting body 17 and the second volume adjusting body 19 is preferably large.

The first cleaning fluid 2 is, for example, air, compressed air, heated air, heated compressed air, dry air, or steam. The first fluid source 25 includes a shut-off valve. The first fluid source 25 is, for example, a fluid inlet of a first cleaning fluid 2, a compressor, a dryer, a blower, an air heater, or a steam generator. The first fluid source 25 delivers the first cleaning fluid 2 to the first nozzle 29 during pre-drying. The first fluid source 25 shuts off the first nozzle 29 and the outside air when drying under reduced pressure.

A plurality of first nozzles 29 are disposed along the rotation axis 1. The first nozzle 29 is connected to the first fluid source 25. The first nozzle 29 is, for example, installed in the first nozzle block 27. The first nozzle block 27 is, for example, embedded in the second volume adjusting body 19.

Figure 4:
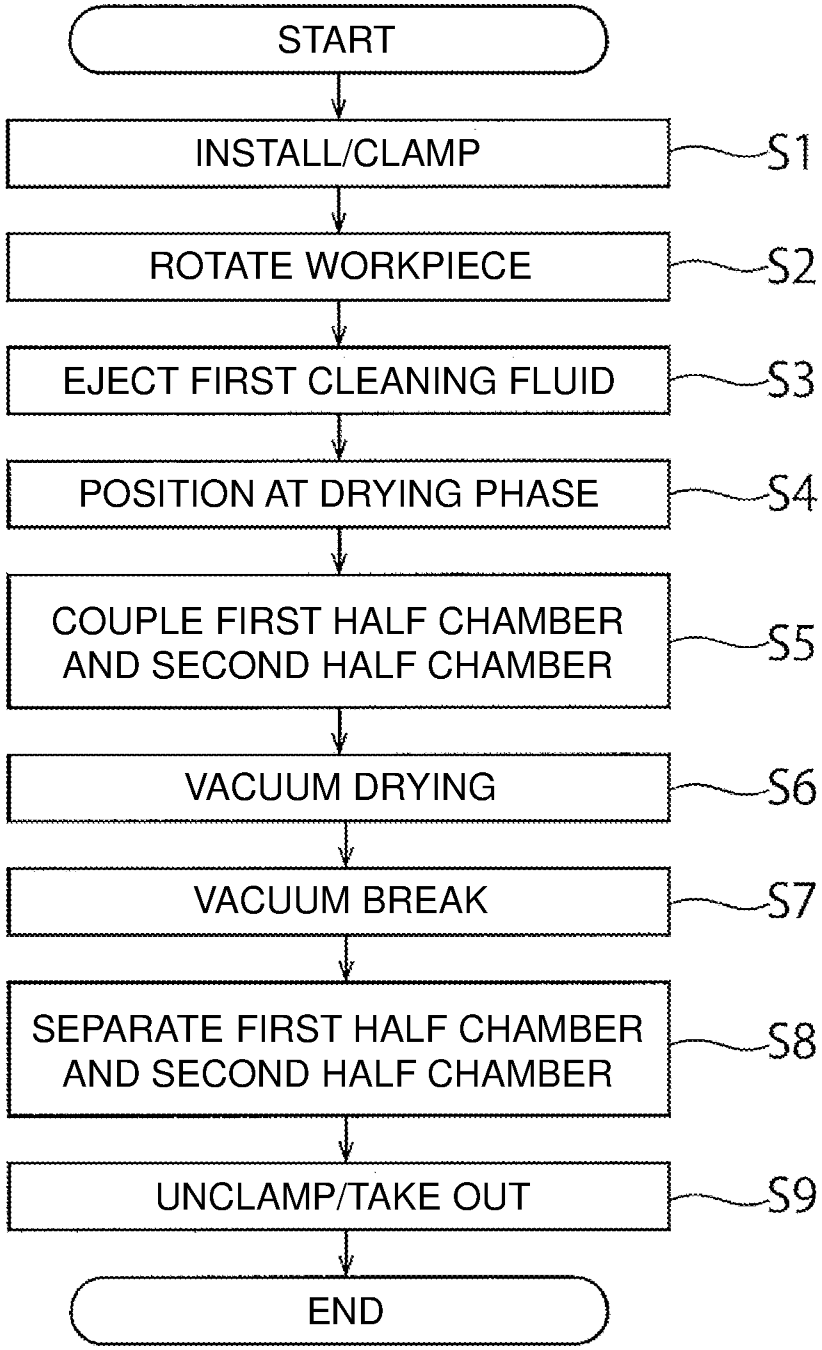
FIG. 4 is a flowchart showing a vacuum drying method according to the first embodiment.

Referring to FIG. 4, a method of using the vacuum dryer 10 will be described. Initially, the second half chamber 15 is located at the separated position 6.

In step S1, the workpiece 7 is installed on the drying table 22 and is fixed to the drying table 22 by the clamp 23

In step S2, the rotating device 18 rotates the drying table 22. Preferably, the rotating device 18 rotates the drying table 22 at a high speed. Then, the liquid adhered to the workpiece 7 is shaken off. The rotating device 18 may then reduce the rotational speed of the drying table 22.

In step S3, the first fluid source 25 supplies the first cleaning fluid 2 to the first nozzle 29. The first nozzle 29 ejects the first cleaning fluid 2 toward the workpiece 7. The workpiece 7 rotates integrally with the drying table 22. Thus, the first cleaning fluid 2 is sprayed over the entire periphery of the workpiece 7, and the liquid adhering to the workpiece 7 is mostly removed. Thereafter, the first fluid source 25 stops supplying the first cleaning fluid 2. Then, the first nozzle 29 stops the ejection.

In step S4, the rotating device 18 stops the drying table 22 at the drying phase 9.

In step S5, the first moving device 16 moves the second half chamber 15 to the coupled position 8. Thus, the first half chamber 11 and the second half chamber 15 are coupled to form the hermetic chamber 12. At this time, the first volume adjusting body 17 and the second volume adjusting body 19 reduce the volume of the space inside the hermetic chamber 12.

In step S6, the vacuum pump 24 discharges the air inside the hermetic chamber 12. As the first volume adjusting body 17 and the second volume adjusting body 19 reduce the volume of the space inside the hermetic chamber 12, the pressure reduces rapidly. When the pressure inside the hermetic chamber 12 reduces below the vapor pressure of the liquid adhered to the workpiece 7, the liquid adhered to the workpiece 7 vaporizes to dry the workpiece 7.

In step S7, the vacuum pump 24 introduces outside air into the inside of the hermetic chamber 12, and returns the pressure inside the hermetic chamber 12 to atmospheric pressure.

In step S8, the first moving device 16 moves the second half chamber 15 to the separated position 6.

In step S9, the clamp 23 unclamps the workpiece 7, and the workpiece 7 is taken out. Note that step S3 may be omitted.

The vacuum dryer 10 according to the present embodiment is mainly used for drying mechanical components after cleaning. The mechanical component, which is a workpiece 7, for example, is an inverter case for an automobile, a pump for an automobile, a sensor case, a brake system component for an automobile, or an HDD case. A cleaning liquid (e.g., an aqueous cleaning liquid) is adhered to the workpiece 7.

In the vacuum dryer 10 of the present embodiment, the workpiece 7 is rotated in advance to shake off the liquid adhered to the workpiece 7. This allows the mass of the liquid adhered to the workpiece 7 to be reduced before drying under reduced pressure. The first nozzle 29 ejects the first cleaning fluid 2 toward the workpiece 7 while the workpiece 7 is rotating. This effectively removes the liquid adhered to the workpiece 7. The first nozzle 29 is disposed inside the first half chamber 11 to eject the first cleaning fluid 2 in a direction toward the first opening 11*a*. This allows the liquid blown from the workpiece 7 to be easily discharged to the outside of the first half chamber 11. In drying under reduced pressure, the liquid vapored by removing the heat of vaporization from the surroundings to keep the equilibrium state. According to the present embodiment, the workpiece 7 is rotated and blown in advance to reduce the amount of liquid remained in the hermetic chamber 12, which reduces the drying time.

The first volume adjusting body 17 and the second volume adjusting body 19 reduce the volume of the space inside the hermetic chamber 12, which reduces the amount of air discharged from the hermetic chamber 12 by the vacuum pump 24. This increases the vacuum speed and reduces the time to start drying after sealing. Further, the amount of air introduced into the hermetic chamber 12 is also reduced, which reduces the time for dividing the hermetic chamber 12 after drying under reduced pressure.

The first opening 11*a* is inclined backward as it is directed upward, which causes a part of the workpiece 7 installed to protrude from the first opening 11*a*. This allows the workpiece 7 to be easily taken out from above.

The rotation axis 1 extends in the vertical direction. This reduces the moment load applied to the swivel shaft 21*b* by the workpiece elongated in the axial direction. For example, most of the cleaning apparatus including a rotation table has the rotation axis extending in the vertical direction. When combined with such a cleaning apparatus, the workpiece is attached to the vacuum dryer 10 of the present embodiment without changing the posture of the workpiece 7 that is taken out from the cleaning apparatus in the preceding process.

The second half chamber 15 reciprocates horizontally between the separated position 6 and the coupled position 8. This reduces the height of the vacuum dryer 10.

Second Embodiment

Figure 5:
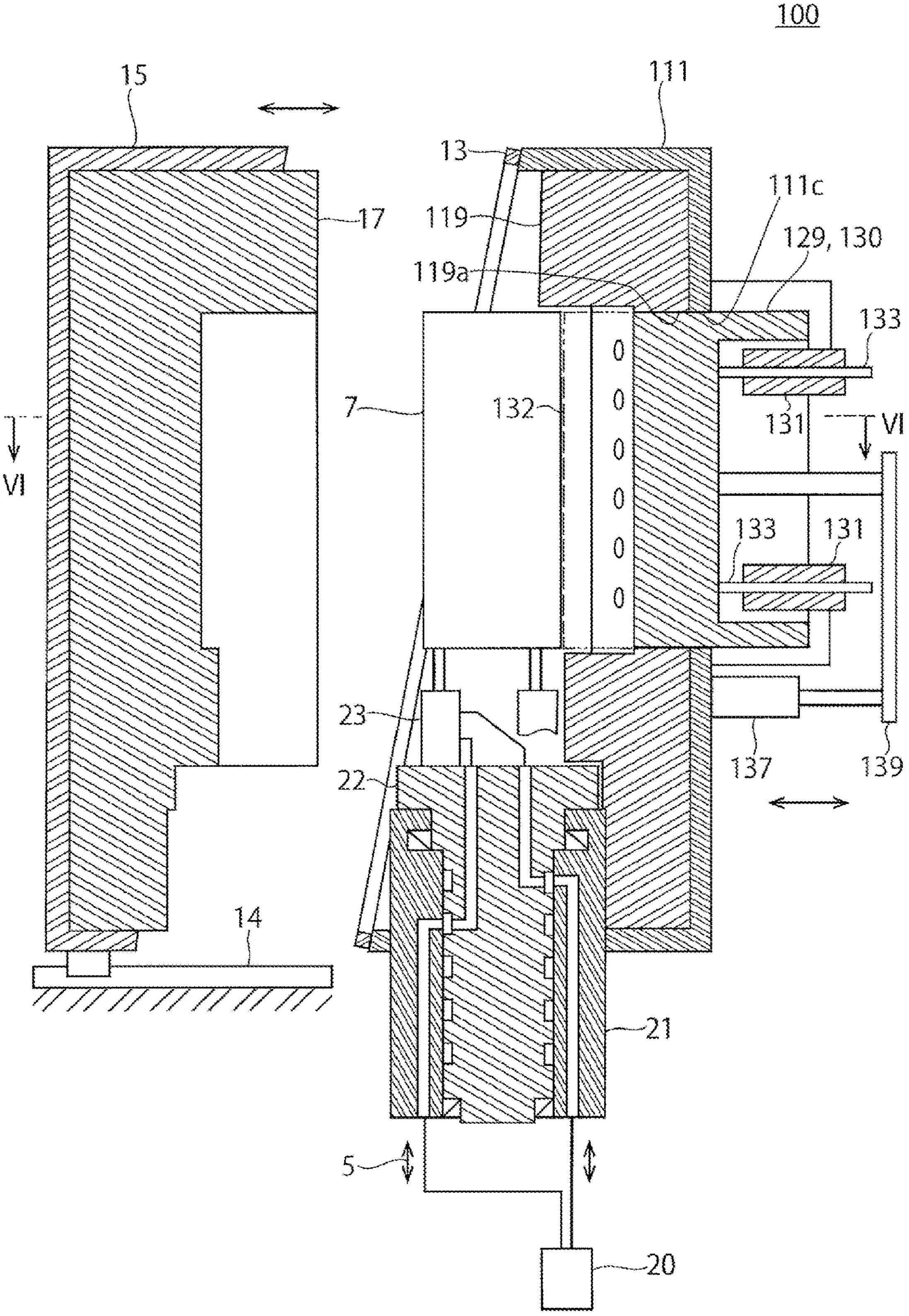
FIG. 5 is a longitudinal sectional view of the vacuum dryer according to a second embodiment.
Figure 6:
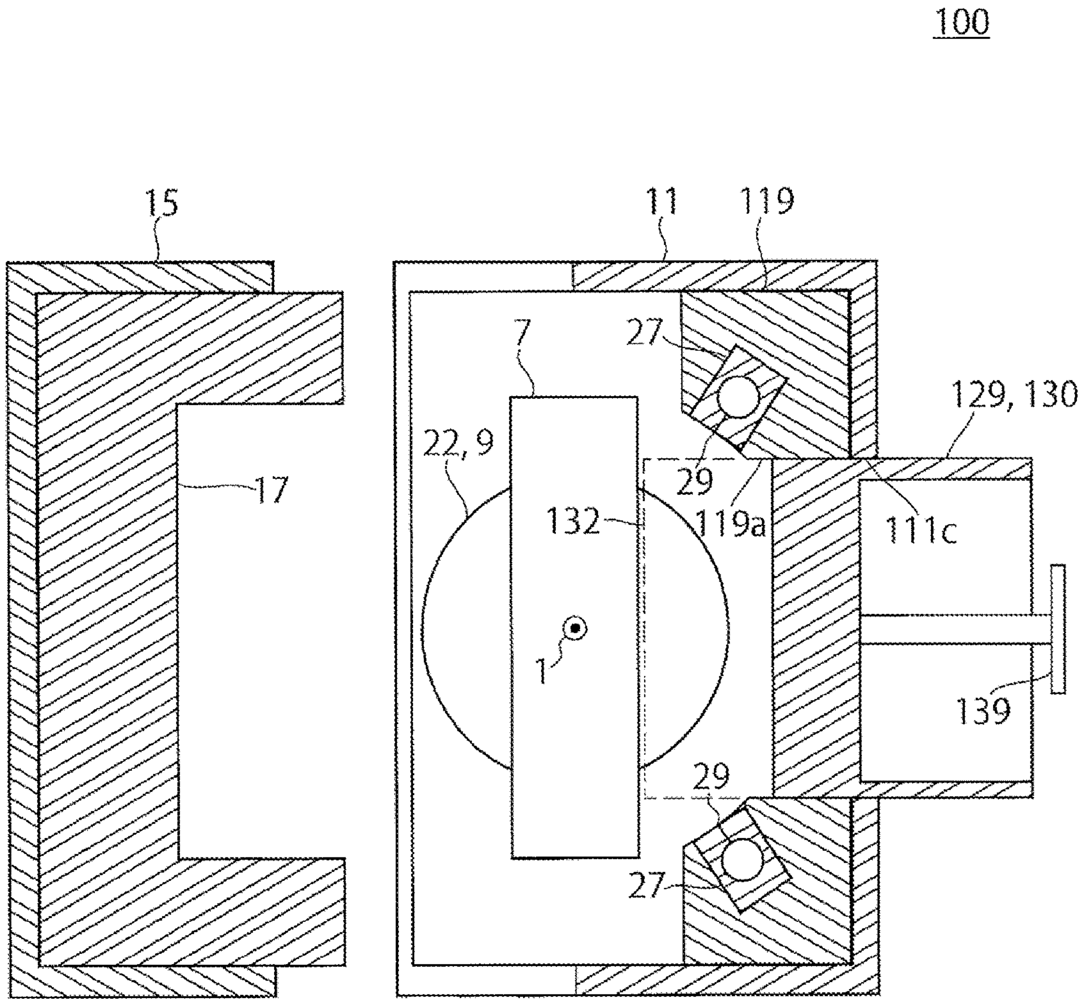
FIG. 6 is a cross-sectional view along line VI-VI in FIG. 5.

As shown in FIGS. 5 and 6, a vacuum dryer 100 of the present embodiment includes a first half chamber 111, a second volume adjusting body 119, a third volume adjusting body 129, a guide bush 131, a guide shaft 133, a second moving device 137, and a connecting plate 139. The rest of the configuration is the same as that of the vacuum dryer 10 of the first embodiment.

The first half chamber 111 has a third opening 111*c* at the rear. The third opening 111*c* is a rectangular through hole disposed at the rear of the first half chamber 111.

The second volume adjusting body 119 has a through hole 119*a*. The through hole 119*a* has the same cross-sectional area as the third opening 111*c*, and passes through the second volume adjusting body 119 in the front-rear direction from the third opening 111*c*.

The third volume adjusting body 129 has a rectangular parallelepiped shape, and is disposed so as to pass through the third opening 111*c* and the through hole 119*a*. A gap between the third volume adjusting body 129 and the third opening 111*c* is sealed. The gap between the third opening 111*c* and the through hole 119*a* and the gap between the third volume adjusting body 129 and the through hole 119*a* may be sealed. The third volume adjusting body 129 reciprocates between a close position 132 and a retracted position 130. At the close position 132, the third volume adjusting body 129 approaches the workpiece 7 at the drying phase 9. At the close position 132, the third volume adjusting body 129 occupies most of the space between the workpiece 7 at the drying phase 9 and the second volume adjusting body 119. At the retracted position 130, the third volume adjusting body 129 is separated from the workpiece 7. At the retracted position 130, the third volume adjusting body 129 does not interfere with the rotation of the workpiece 7 and the clamp 23.

The guide shaft 133 is fixed to the third volume adjusting body 129. The guide shaft 133 extends in the front-rear direction. The guide bush 131 is fixed to the first half chamber 111. The guide bush 131 guides the guide shaft 133. For example, the vacuum dryer 100 includes a pair of guide bushes 131 and a pair of guide shafts 133.

Instead of the pair of guide bushes 131 and guide shafts 133, ball splines or linear guides may be arranged.

The second moving device 137 is, for example, an air cylinder, or an electric cylinder. The second moving device 137 has a telescopic rod connected to the third volume adjusting body 129 with a connecting plate 139. The second moving device 137 moves the third volume adjusting body 129 with the connecting plate 139.

At step S5 in the flowchart of FIG. 4, the second moving device 137 moves the third volume adjusting body 129 to the close position 132 when using the vacuum dryer 100. Then, in step S8, the second moving device 137 moves the third volume adjusting body 129 to the retracted position 130.

According to the present embodiment, the third volume adjusting body 129 moves to the close position 132 to further reduce the space in the hermetic chamber 12. This increases the vacuum speed, and reduces the drying time.

Third Embodiment

As shown in FIG. 7, the vacuum dryer 200 of the present embodiment includes a turntable 251, two first half chambers 211, a single second half chamber 215, a second fluid source 253, a second nozzle 257, and a second nozzle block 255.

The turntable 251 is, for example, a 180 degree two-position turntable. The turntable 251 is pivoted by 180 degrees about a pivot axis 3. The two first half chambers 211 are disposed on the turntable 251 in a 180-degree rotational symmetric manner about the pivot axis 3. The two first half chambers 211 swivel together with the turntable 251. This positions one of the first half chambers 211 at a loading position 261, and the other first half chamber 211 at a vacuum drying position 263.

The first half chamber 211 has a first opening 211*a*. The first half chamber 211 is recessed toward the pivot axis 3. The first opening 211*a* extends vertically from the center to the top. The lower portion of the first opening 211*a* is inclined so as to be farther from the pivot axis 3 as it goes downward. Other configurations of the first half chamber 211 are the same as those of the first half chamber 11.

The second half chamber 215 has a second opening 215*a*. The second half chamber 215 is disposed on the linear motion guide 14. The second half chamber 215 is couplable to the first half chamber 211 located at the vacuum drying position 263. The second opening 215*a* is in close contact with the first opening 211*a* when the second half chamber 215 is located at a coupled position.

The second cleaning fluid 4 is, for example, heated air, heated compressed air, or steam. The second fluid source 253 is, for example, an air heater, or a steam generator. One or more second nozzles 257 are disposed in parallel to the rotation axis 1 on the outside of the first half chamber 211 located at the loading position 261. The second nozzle 257 is connected to the second fluid source 253. The second nozzle 257 ejects the second cleaning fluid 4 toward the workpiece 7 located at the loading position 261. The second nozzle 257 may be disposed on the second nozzle block 255.

In the present embodiment, the first cleaning fluid 2 is, for example, compressed air.

The first opening 211*a* has a shape upwardly approaching to the pivot axis 3. Thus, the workpiece 7 protrudes from the first opening 211*a*. This allows the second cleaning fluid 4 ejected from the second nozzle 257 to easily reach the workpiece 7.

The first opening 211*a* is bent at the central portion and extends vertically upward from the central portion. An upper portion from the center portion of the workpiece 7 is located closer to the second nozzle 257 than the first opening 211*a*. Thus, the second cleaning fluid 4 is more likely to collide with the workpiece 7. In addition, the distance between the second nozzle 257 and the workpiece 7 can be shortened. This suppresses the temperature of the second cleaning fluid 4 from decreasing when the second cleaning fluid 4 is a heated fluid.

When the second cleaning fluid 4 is a heated fluid, the temperature of the workpiece 7 can be raised by the second cleaning fluid 4 in advance. This reduces the drying time of the workpiece 7.

Figure 8:
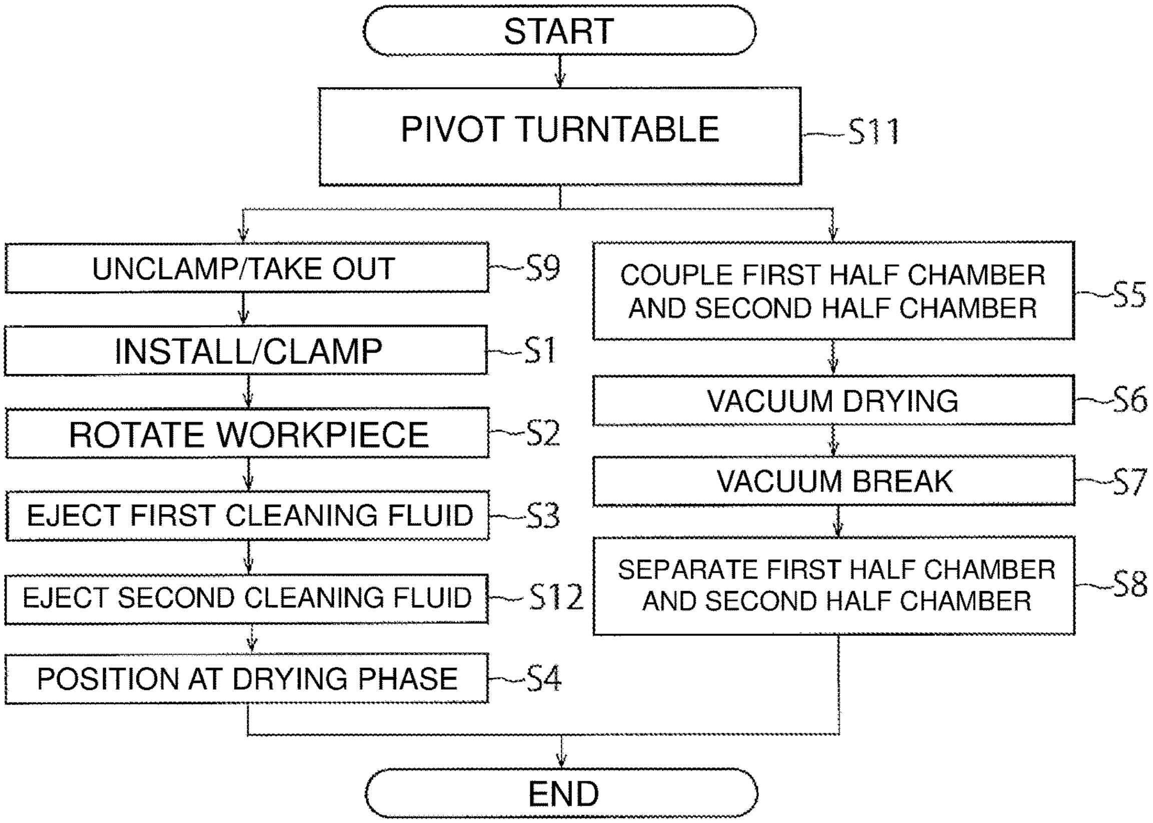
FIG. 8 is a flowchart showing a vacuum drying method according to the third embodiment.

With reference to FIG. 8, the drying method of this embodiment will be explained. The steps S9, S1-S3, S12 and S4 shown on the left side of FIG. 8 are performed at the loading position 261. The steps S5-S8 shown on the right side of FIG. 8 are performed at the vacuum drying position 263. The steps S1 to S9 are the same as in FIG. 4.

In step S11, the turntable 251 is pivoted. Then, the workpiece 7 which has been dried under reduced pressure moves from the vacuum drying position 263 to the loading position 261. Then, the workpiece 7, which has been preliminarily dried, moves from the loading position 261 to the vacuum drying position 263

At the loading position 261, the following steps are performed. First, in step S9, the workpiece 7, which has been dried, is unclamped and taken out. In step S1, a workpiece 7 to be dried next is installed and clamped. Next, the steps S2 to S3 are performed. In step S12, the second fluid source 253 supplies the second cleaning fluid 4 to the second nozzle 257. The second nozzle 257 ejects the second cleaning fluid 4 toward the workpiece 7. The drying table 22 and the workpiece 7 continue to rotate. Preferably, in step S12, the rotation speed of the drying table 22 is lowered. The jet of the second cleaning fluid 4 collides with the entire circumference of the workpiece 7. When the second cleaning fluid 4 is a heated fluid, the workpiece 7 is heated by the second cleaning fluid 4. Next, the step S4 is performed.

At the vacuum drying position 263, the steps S5 to S8 are performed on the pre-dried workpiece 7. Here, the workpiece 7 moves to the vacuum drying position 263 located at the drying phase 9. This allows to perform the step S5 immediately after the step S11.

The steps S9, S1 to S3, S12, and S4 at the loading position 261 are performed simultaneously with the steps S5 to S8 at the vacuum drying position 263. Thus, the present embodiment further reduces the drying time.

The step S3 may be omitted.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

7 Workpiece
9 Drying phase
11, 111, 211 First half chamber
11*a*, 211*a* First opening
12 Hermetic chamber
15, 215 Second half chamber
15*a*, 215*a* Second opening
16 Moving device (first moving device)
17 First volume adjusting body
22 Drying table
24 Vacuum pump

What is claimed is:

1. A vacuum dryer for drying a workpiece, the vacuum dryer comprising:
- a first half chamber having
  - a first opening, and
  - a rotatable drying table on which the workpiece is fixed, the drying table configured to be positioned at a drying phase;
- a second half chamber having a second opening configured to be in close contact with the first opening, the second half chamber configured to be coupled with the first half chamber to form a hermetic chamber;
- a first moving device configured to move the second half chamber relative to the first half chamber between a separated position and a coupled position, the second half chamber being separated from the first half chamber at the separated position, and the second opening being in close contact with the first opening at the coupled position;
- a first volume adjusting body disposed in the second half chamber, the first volume adjusting body having a shape that does not collide with the workpiece and the drying table when the drying table is positioned at the drying phase and the second half chamber is located at the coupled position;
- a vacuum pump connected to the hermetic chamber:
- a working fluid source;
- a clamp disposed on the drying table, the clamp having a fluid cylinder, the clamp configured to fix the workpiece to the drying table;
- a hollow housing disposed to be inserted into the first half chamber:
- a swivel shaft coupled with the drying table, the swivel shaft configured to rotate with the drying table inside the housing;
- an annular channel circumferentially located between the housing and the swivel shaft;
- a first channel located inside the housing to connect the working fluid source and the annular channel; and
- a second channel located inside the swivel shaft to connect the fluid cylinder and the annular channel.

2. The vacuum dryer according to claim 1, wherein the first volume adjusting body has a surface shape in conformity with the workpiece and the drying table.

3. The vacuum dryer according to claim 2, wherein the first volume adjusting body is removably disposed in the second half chamber.

4. The vacuum dryer according to claim 2, further comprising:
- a first nozzle disposed in the first half chamber, the first nozzle configured to eject first cleaning fluid toward the workpiece.

5. The vacuum dryer according to claim 2, wherein the workpiece is fixed on the drying table to partially protrude from the first opening.

6. The vacuum dryer according to claim 2, further comprising:
- a second volume adjusting body disposed in the first half chamber, the second volume adjusting body having a shape that does not collide with the workpiece and the drying table when the drying table rotates.

7. The vacuum dryer according to claim 1, wherein the first volume adjusting body is removably disposed in the second half chamber.

8. The vacuum dryer according to claim 7, further comprising:
- a first nozzle disposed in the first half chamber, the first nozzle configured to eject first cleaning fluid toward the workpiece.

9. The vacuum dryer according to claim 7, wherein the workpiece is fixed on the drying table to partially protrude from the first opening.

10. The vacuum dryer according to claim 7, further comprising:
- a second volume adjusting body disposed in the first half chamber, the second volume adjusting body having a shape that does not collide with the workpiece and the drying table when the drying table rotates.

11. The vacuum dryer according to claim 1, further comprising:
- a first nozzle disposed in the first half chamber, the first nozzle configured to eject first cleaning fluid toward the workpiece.

12. The vacuum dryer according to claim 11, wherein the workpiece is fixed on the drying table to partially protrude from the first opening.

13. The vacuum dryer according to claim 11, further comprising:
- a second volume adjusting body disposed in the first half chamber, the second volume adjusting body having a shape that does not collide with the workpiece and the drying table when the drying table rotates.

14. The vacuum dryer according to claim 1, wherein the workpiece is fixed on the drying table to partially protrude from the first opening.

15. The vacuum dryer according to claim 1, further comprising:

a second volume adjusting body disposed in the first half chamber, the second volume adjusting body having a shape that does not collide with the workpiece and the drying table when the drying table rotates.

16. The vacuum dryer according to claim 1, wherein the first opening is inclined rearward toward upward as viewed from the first opening.

17. The vacuum dryer according to claim 1, wherein the drying table is rotatable about a vertical axis, and the second half chamber is horizontally movable from the separated position to the coupled position.

18. The vacuum dryer according to claim 1, further comprising:

a second nozzle located outside the first half chamber to eject second cleaning fluid toward the workpiece.

19. The vacuum dryer according to claim 1, further comprising:

a third volume adjusting body disposed in the first half chamber, the third volume adjusting body having a shape that does not collide with the workpiece and the drying table when the drying table is located at the drying phase; and a second moving device configured to move the third volume adjusting body between a retracted position and a close position, the third volume adjusting body having a shape that does not collide with the workpiece and the drying table at the retracted position when the drying table rotates, the third volume adjusting body being close to the workpiece positioned at the drying phase and the drying table at the close position.

* * * * *